US012794405B2

(12) United States Patent
Van Den Bos

(10) Patent No.: US 12,794,405 B2
(45) Date of Patent: Nov. 10, 2026

(54) METHOD FOR THE ATTACHMENT AND PLACEMENT OF A PV-SYSTEM

(71) Applicant: RABLE HOLDING B.V., Delft (NL)

(72) Inventor: Wouter Van Den Bos, Delft (NL)

(73) Assignee: RABLE HOLDING B.V., Delft (NL)

( * ) Notice: Subject to any disclaimer, the term of this patent is extended or adjusted under 35 U.S.C. 154(b) by 0 days.

(21) Appl. No.: 18/270,874

(22) PCT Filed: Jan. 5, 2022

(86) PCT No.: PCT/NL2022/000001
§ 371 (c)(1),
(2) Date: Jul. 5, 2023

(87) PCT Pub. No.: WO2022/149977
PCT Pub. Date: Jul. 14, 2022

(65) Prior Publication Data

US 2024/0305242 A1 Sep. 12, 2024

(30) Foreign Application Priority Data

Jan. 6, 2021 (NL) ..................................... 1043899

(51) Int. Cl.
*H02S 30/20* (2014.01)
*H02S 20/30* (2014.01)

(52) U.S. Cl.
CPC .............. *H02S 30/20* (2014.12); *H02S 20/30* (2014.12)

(58) Field of Classification Search
CPC .......... H02S 20/30; H02S 20/23; H02S 20/24; H02S 30/00–20
See application file for complete search history.

(56) References Cited

U.S. PATENT DOCUMENTS

2010/0000165 A1* 1/2010 Koller ..................... F24S 23/77 136/246
2014/0190556 A1* 7/2014 Conger ..................... E02B 1/00 52/173.3

(Continued)

FOREIGN PATENT DOCUMENTS

CN 204794857 U 11/2015
CN 108418533 A 8/2018

(Continued)

OTHER PUBLICATIONS

English machine translation of Lei et al. (CN 108418533) published Aug. 17, 2018.*

(Continued)

*Primary Examiner* — Christina Chern
(74) *Attorney, Agent, or Firm* — The Webb Law Firm

(57) ABSTRACT

PV system, suitable to be applied to a foundation such as a roof, including a number of panels with solar cells and/or frameworks suitable for the attachment of solar panels; therefore characterized that the panels and/or frameworks form structural parts of the system. Hereby the side edges of the solar panel can form part of the spatial truss structure. In this way it is possible to build a system, which can consist of a large number of connected solar panels, which, by the addition of pull/push elements create a spatial truss structure. With this truss structure the system has a (self) supporting character, causing a reduction in the load on to the foundation.

8 Claims, 9 Drawing Sheets

(56) References Cited

U.S. PATENT DOCUMENTS

| | | | |
|---|---|---|---|
| 2016/0218664 | A1 | 7/2016 | Wehrli |
| 2019/0006984 | A1 | 1/2019 | Albertella |
| 2019/0386606 | A1 | 12/2019 | Raghunathan |

FOREIGN PATENT DOCUMENTS

| | | | | | |
|---|---|---|---|---|---|
| CN | 110601653 | A | * | 12/2019 | ............. H02S 20/30 |
| EP | 2843320 | A1 | | 3/2015 | |
| JP | 2005101103 | A | * | 4/2005 | |
| WO | 2015074812 | A1 | | 5/2015 | |
| WO | 2016049710 | A1 | | 4/2016 | |
| WO | 2017100862 | A1 | | 6/2017 | |

OTHER PUBLICATIONS

English machine translation of Wang et al. (CN 110601653) published Dec. 20, 2019.*

Wikipedia article for "king post" retrieved from https://en.wikipedia.org/wiki/King_post on May 7, 2025.*

English machine translation of Murata et al. (JP 2005/101103) published Apr. 14, 2005.*

Dictionary definition of "bridge" from Cambridge retrieved from https://dictionary.cambridge.org/us/dictionary/english/bridge on Mar. 30, 2026.*

Baker, D. Engineering Statics: Open and Interactive 6.3 Trusses retrieved from https://engineeringstatics.org/Chapter_06-trusses.html on Mar. 30, 2026.*

Solotech Global truss 9.02 Ft F34 Vertical Truss Totem Alternatives retrieved from https://shop.solotech.com/products/global-truss-9-02-ft-f34-vertical-truss-totem on Mar. 30, 2026.*

* cited by examiner

METHOD FOR THE ATTACHMENT AND PLACEMENT OF A PV-SYSTEM

CROSS-REFERENCE TO RELATED APPLICATIONS

This application is the United States national phase of International Application No. PCT/NL2022/000001 filed Jan. 5, 2022, and claims priority to The Netherlands Patent Application No. 1043899 filed Jan. 6, 2021, the disclosures of which are hereby incorporated by reference in their entireties.

BACKGROUND OF THE INVENTION

Field of the Invention

The invention concerns the design for the connection and support of photovoltaic (PV) panels. The design furthermore concerns a mechanism and attachment method of PV-panels.

Similar designs are known, in which the panels are mutually connected via a lower beam which mechanically, or using additional ballast, creates a foundation for the individual PV panels. Generally, the panels are attached to the support structure in the final step and are connected via plugs for the electrification of the PV system. Since current solar panel or PV systems must withstand wind and snow loads, generally additional ballast is added, to prevent "uplift and shift". The large dead weight and the additional loads create a large problem for different types of foundations, for example roofs and/or other foundations, which are not designed to withstand this additional load and possibly require reinforcing.

An additional disadvantage of the current system is the installation time required for the assembly of the individual components on the roof. Besides the physical strain for the installer, caused by the heavy components, it ensures a high throughput time and high costs since such structures are labor intensive. Despite most panels have a dead weight less than 25 kg to fulfill the health and safety legislation, lifting of these panels, with large dimensions and a deadweight of 25 kg, in combination with wind is not ideal. Also, errors can be made quickly in the process of correct cabling and transmitting, since this is executed on the roof with variable weather conditions. Potential connection errors and fire safety are obviously dependent on the ability of the installer, who executes multiple repetitive operations, which increases the risk for human errors.

Description of Related Art

There are PV systems, as described in WO2017100862A1, where the entire system can be folded and unfolded. Between the lower hinge points a cable or flexible element is attached, capable of carrying tensile forces only, to create the right angle between the panels in the unfolded position. This system is specifically designed for fast placement and removal of a PV system on a solid or load bearing foundation. In the unfolded position ballast and support is required at every lower hinge point. For weak foundations, such as roofs, this invention is unsuitable since it needs to be constantly supported and lacks the ability to be self-supporting. The cable connecting the lower hinge points is merely to fixate the angle between the panels and can only be loaded in tension and therefore and is not part of a (self)-supporting spatial truss-like construction.

The patent CN204794857U also is a connected system which operates according to the principle of a linkage system however the unfolding principle is different, and the unfolded system does not form a self-supporting spatial truss structure. This application shows clear added value in fast unfolding of connected PV panels but does not offer a solution for weak foundations or a foundation with only several distant load bearing points.

SUMMARY OF THE INVENTION

Thus, the invention intends to provide in a design which does not have the above-mentioned and/or other disadvantages, or at least partially cancels these, while the advantages thereof are at least partially retained.

Furthermore, the invention intends to offer a design and operating principle which simplifies the placement of solar panels, requires less operations and where the functional checks and quality tests can take place in a workshop.

At least one of this and/or other goals is achieved with a PV system or coupling of PV systems, suitable for application on a foundation, comprising several solar panels and/or frameworks suitable for the attachment of solar panels, therefore characterized that the panels and/or frameworks create structural bearing components of the system.

Hereby the side edges of the panels or frameworks can be connected to the system either to the lower as well as the upper beam with connecting elements capable of carrying tensile and compression forces. Because in the way a spatial truss structure is created, the solar panels or frameworks are part of a lightweight (self-)supporting bending resistant spatial structure.

Hereby the panels and/or frameworks can be mutually (hinged) connected. This enables easy extending and unfolding, where the installation does not have to carry and assemble each panel, and where the electrical connections already can be installed. This can therefore save much installation time. Besides this, since the structure is at least in part self-supporting, de load on the roof can be limited.

Furthermore, the panels and/or frameworks can contain two overlying side edges, where the system contains at least two end panels or frameworks and possibly several intermediate panels and/or frame works, where the intermediate panels and/or frameworks on one first side edge are or are not hinge connected with a following panel or framework, and where the end panels or frameworks merely are connected to the first or second side with or the preceding or the next panel or framework.

With this configuration, the system can be completely electrically cabled and is easy to unfold. The installation of the PV system is therefore less physically stressful for the installers.

Hereby the PV system can comprise of a folded and unfolded configuration, and in an unfolded configuration the panels and/or frameworks mutually with adjacent panels and/or frameworks can form an angle.

Since the invention can be easily folded and unfolded and is portable and in folded condition remains compact, the PV system can be easily placed and removed later. (for example for maintenance or to avoid damage by hail)

The panels and/or frameworks can alternatingly be provided with slider, rollers, or wheels on one first side edge or on one second side edge.

Furthermore, the panels and/or frameworks can be alternatingly on one first side or on one second side edge be provided with elements which can primarily be loaded on tension and/or pressure. These elements, executed by for example rods or cables, form a connection from the first side edge of the first panel or framework with the second side edge of an adjacent succeeding panel or framework.

The system can make use of the on the foundation installed rails or guides, wherein, upon which or over which the sliders, wheels or rollers can move. As a consequence, both the surface pressure on the foundation and the frictional resistance during unfolding is reduced, resulting in the execution of the unfolding with less force.

Hereby the side edge of the solar panel can be part of a spatial truss structure. In this way a system can be created, which can consist of a large amount of connected solar panels which can create a spatial truss structure by adding the elements capable of carrying tension and compression loads. With this truss structure the system has a (self) supporting function, whereby the load on the foundation can be reduced.

The invention has specifically more relation in the addition of the tension-compression elements at the top of the side edges of the solar panels, which creates a spatial truss structure. This truss structure can cause for additional bending resistance or bending stiffness of the PV system against wind, water and snow load. With this addition it can be possible to create a span with the spatial truss structure from support point to support point. Commonly the supporting structure of a foundation has points or locations, where extra load can be applied, for instance on a roof near the purlins, (side) walls or support columns, but the bearing strength of the intermediate foundation is insufficient. Because the truss structure does not require additional support points, a bridge can be formed between the load carrying points of the foundation. In case the support points are chosen correctly the upper tension and compression elements exclusively are loaded in tension only and the cross-section can be drastically limited and/or replaced by a "tension-only" element like a cable.

The invention also allows to create a bending resistance connection in the direction perpendicular to the PV system. In this way the load carrying capability of the PV-system is extended with a load carrying capability between several (Parallel) PV-systems.

The bearing feature of the PV system results in the unloading of the weak sections of the foundation and prevents that in certain locations a higher total weight of the PV system and/or anchor to the foundation is required to prevent lift of the PV system by upward forces of the wind.

BRIEF DESCRIPTION OF THE DRAWINGS

The invention will be explained in more detail by means of embodiments which are displayed in the drawing. The drawing shows.

DESCRIPTION OF THE INVENTION

Figure 1:
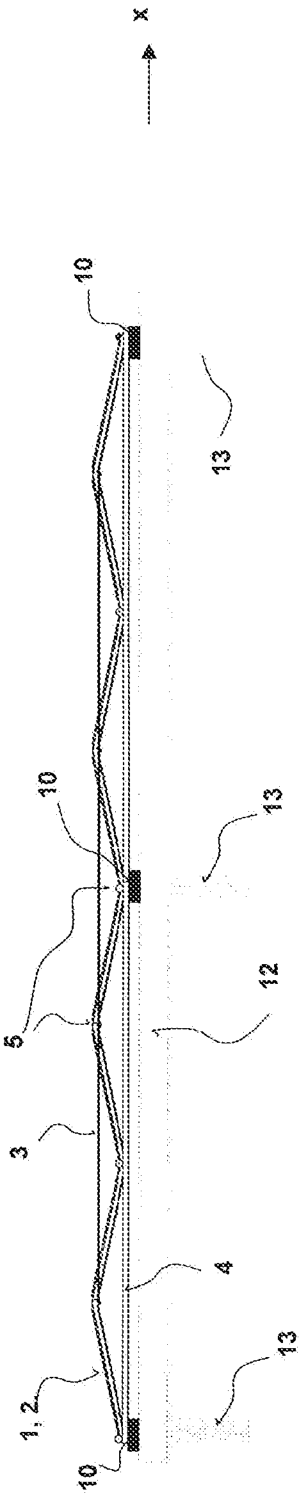
FIG. 1 a schematical side view of a first embodiment of the invention.

It is to be noticed that the drawings are merely a schematic representation of the preferential embodiments of the invention. The drawing should not be seen as a limitation of the invention.

In the figures, equal or corresponding components with corresponding reference numerals are indicated.

The phrase "a PV system" or solar cell system which is used in this specification and/or conclusions should be construed as, is however by no means limited to a series or collection of solar panels or frameworks in which solar panels are to be installed, whereby the system is or is not already equipped with electrical connections and cables.

The expression "stiff" "structurally supporting" or "(self) supporting" which is used in this specification and/or conclusions, should be construed as, is however by no means limited to those elements of a structure which can take a part of the forces and/or loads of the structure. This can for instance be to increase the stiffness and/or strength of structure. Forces can be tension forces, compressive forces, torsional forces, shear forces and/or other forces which can be important forces for the structural integrity.

The expression "roof" or "roofs structure" which is used in this specification and/or conclusions, should be interpreted as, but is by no means limited to a (flat) roof, but can also be a (non-loadbearing) foundation.

The expressions PV panel and solar panel are synonymous and are used interchangeably.

With the expression PV system or PV installation is also meant a connection of PV systems with at least 2 panels.

FIG. 1 shows a side view of the truss structure of the PV system on a roof. By connecting the PV panels solar panels (1) on both the upper side (3) as well as the lower side (4) using tension-compression elements a spatial truss structure is created. The side edges (2) of the PV panels (1) are part of this truss structure.

The tension or compression elements on the upper side (3) and the lower side (4) are connecting elements. The connecting elements are primarily loaded in tension or compression and can be hinged. If the element is merely loaded in tension, the moment of inertia of the cross-section can remain small or a cable can be used.

Because of the (self) support character of the truss structure, it only has to be connected to the foundation with a limited amount of support points (10) These support points can both be a support point as well as a mechanical fastening such as for example a bolt-screw connection through the roof top (roof anchor). The location of these support points (10) can be chosen in such a way, for instance on top of or in the vicinity of a load bearing point (13), in such a way that the weak foundation (12) is not or only limited loaded. In this configuration the advantage is that the roof or foundation, which usually has insufficient bearing capacity, can still be provided with a PV system. The additional loads, as for example own weight, wind and snow on the PV system are not transferred via de weak section on the roof (12) but via the load bearing points (13). Load bearing points of a roof are for example purlins, (side) walls or support columns.

Figure 2:
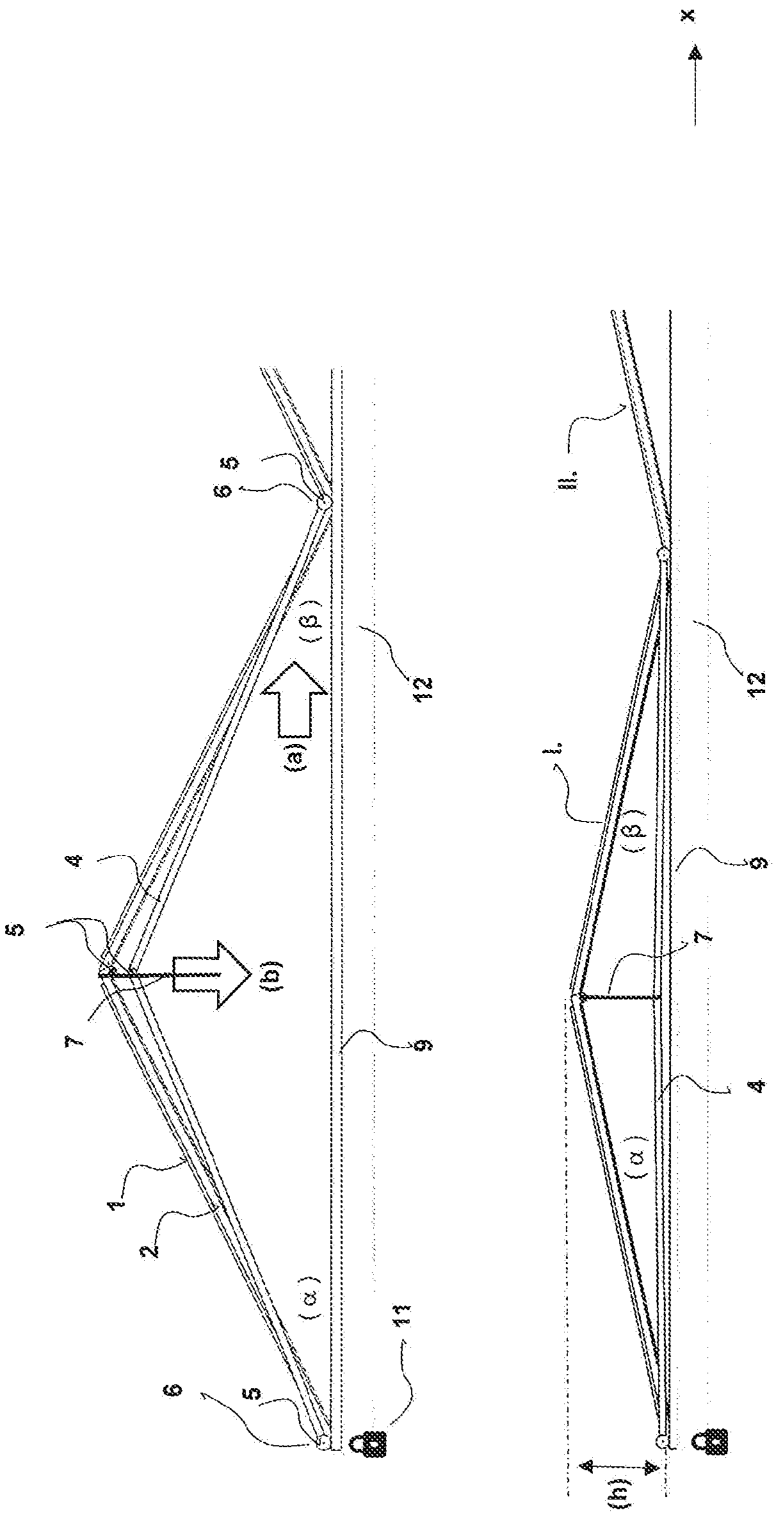
FIG. 2 a schematical side view of a first embodiment of the invention in nearly unfolded and unfolded condition.

FIG. 2 shows the unfolding of the system using hinge points (5) between the solar panels, whereby the rotation is preferably located outside the thickness of the panel. In this way the panels can fold against each other. These hinge points are located on the upper side as well as the lower side of the panel. The tension or compression element on the lower side (4) is hinged in the middle, creating a linkage, whereby the end position and the angles alfa (a) and beta ( ) are defined. In the Fig. the angles alfa (a) and beta ( ) are equal, however, this is not necessary, for instance for a so-called north-south orientation these angles are unequal and the PV panels on the north side do not contain photovoltaic cells.

The low (rolling) resistance between the wheels (6) and the guiderail (9) or foundation prevents braking of the unfold movement. If desired, the unfold movement can be slowed down by using sliders or rollers with a higher sliding resistance instead of wheels. Since the mechanism is fixed on one side only a linear movement (a) can be made. This is possible with a multiple of connected pairs (I, II, . . . n) of solar panels (see FIG. 3).

Figure 3:
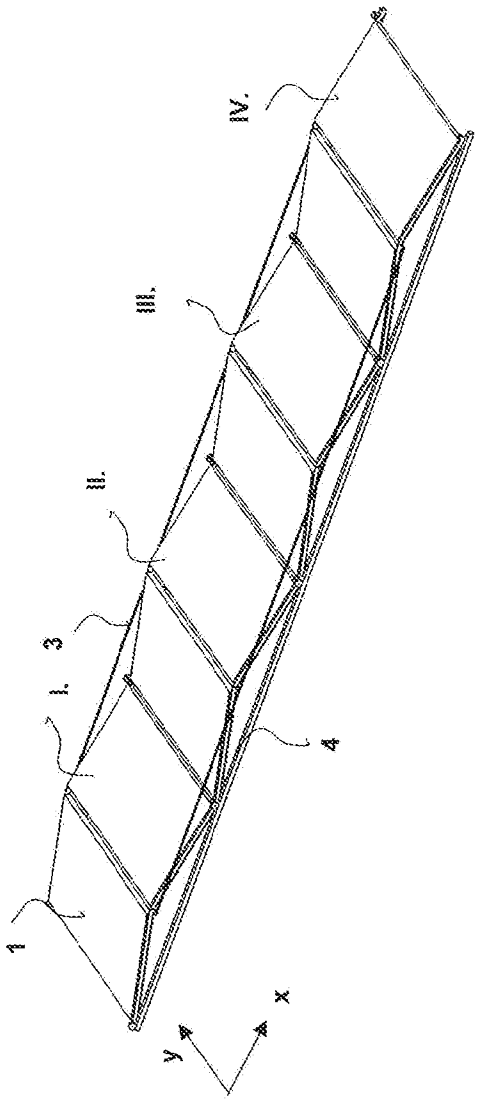
FIG. 3 a schematical perspectival view of a single row of a first embodiment of the invention FIG. 4 schematical top view of the system in various embodiments (PV in landscaper PV in portrait)

In FIG. 3 such an unfolded system is shown in a spatial view for PV or solar panels (1) with four mechanically connected pairs (I till IV) which are connected via tension and compression elements (3,4). The in this way created truss structure forms a large self-supporting span in the longitudinal direction (x), with resistance against positive and negative (caused by for instance wind uplift) loads of own weight, wind and snow; the principle of a bridge.

Figure 4:
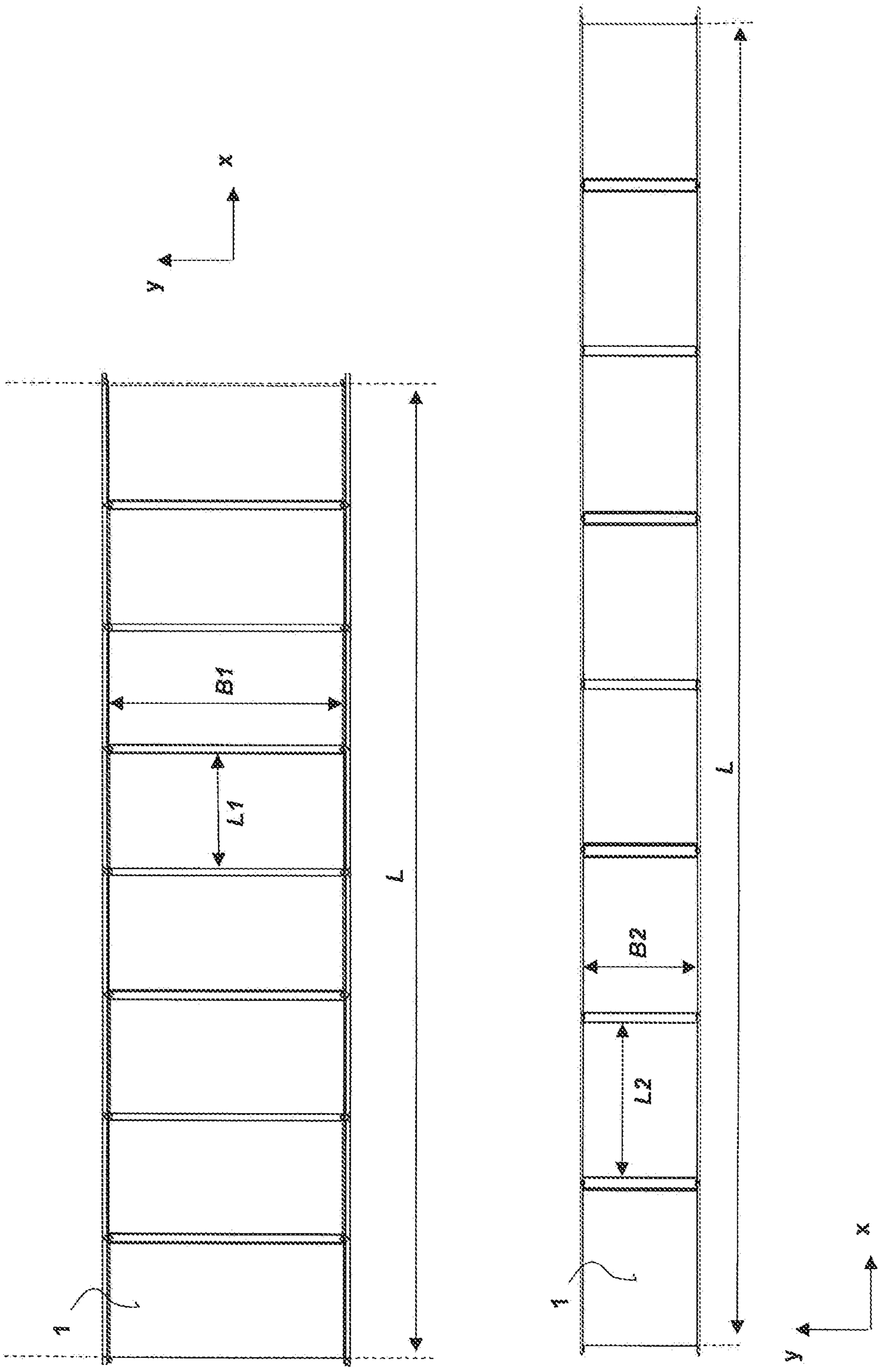

FIG. 4 The maximum span Lin longitudinal direction (x) is dependent on the orientation of the solar panels (1) and the angle beta ( ) determining the height of the truss structure. Increasing height (h) increases the strength or bending resistance of the truss structure. The PV panel generally consists of a panel with photovoltaic solar cells with a frame around (1). A single panel as shown can consist of 1 or more solar panels in either landscape or portrait orientation with a variable final length (L1, L2) and width (B1, B2). Sometimes the protecting frame or side edge (2) is directly integrated in the PV panel.

Figure 5:
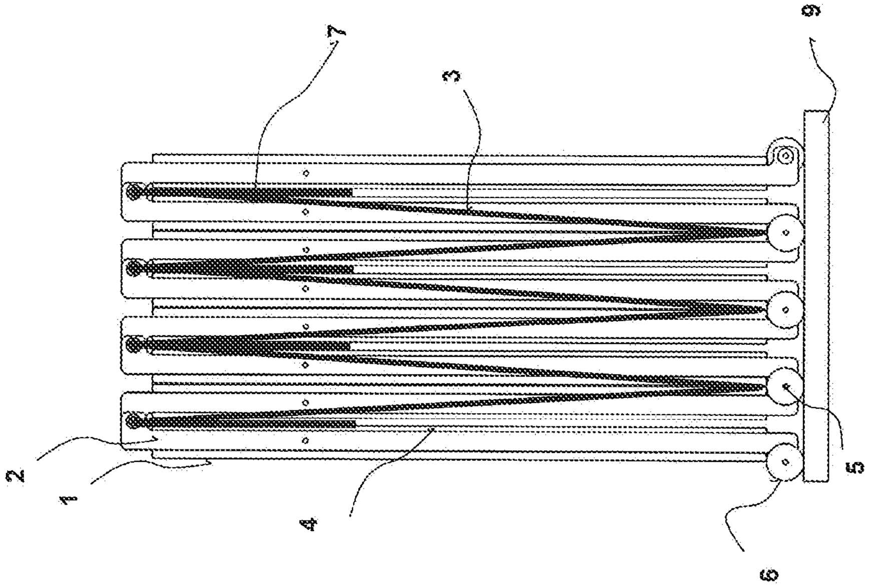
FIG. 5 a first embodiment of the invention in "folded" position when this is prefabricated and delivered FIG. 6 side view with a detail of the hinge line on the top side of the system according to an embodiments of the invention FIG. 7 side view embodiment of the invention with a detail of the hinge line on the lower side of the system where a tension-compression rod will be connected and in most embodiments also a wheel and rail FIG. 8 schematical top view of the connected system according to the embodiment of the invention FIG. 9 spatial view below the structure according to an embodiment of the invention

FIG. 5 shows a system which is pre-assembled and in folded condition using is positioned on the roof (edge) using a hoisting, lifting or transportation machine, after which it is unfolded in one linear movement. During unfolding the wheels (6) support the system, which directly rides on the foundation or by using a rail (5). A large number of panels can be connected, but for the explanation only 4 connected pairs are drawn.

Figure 6:
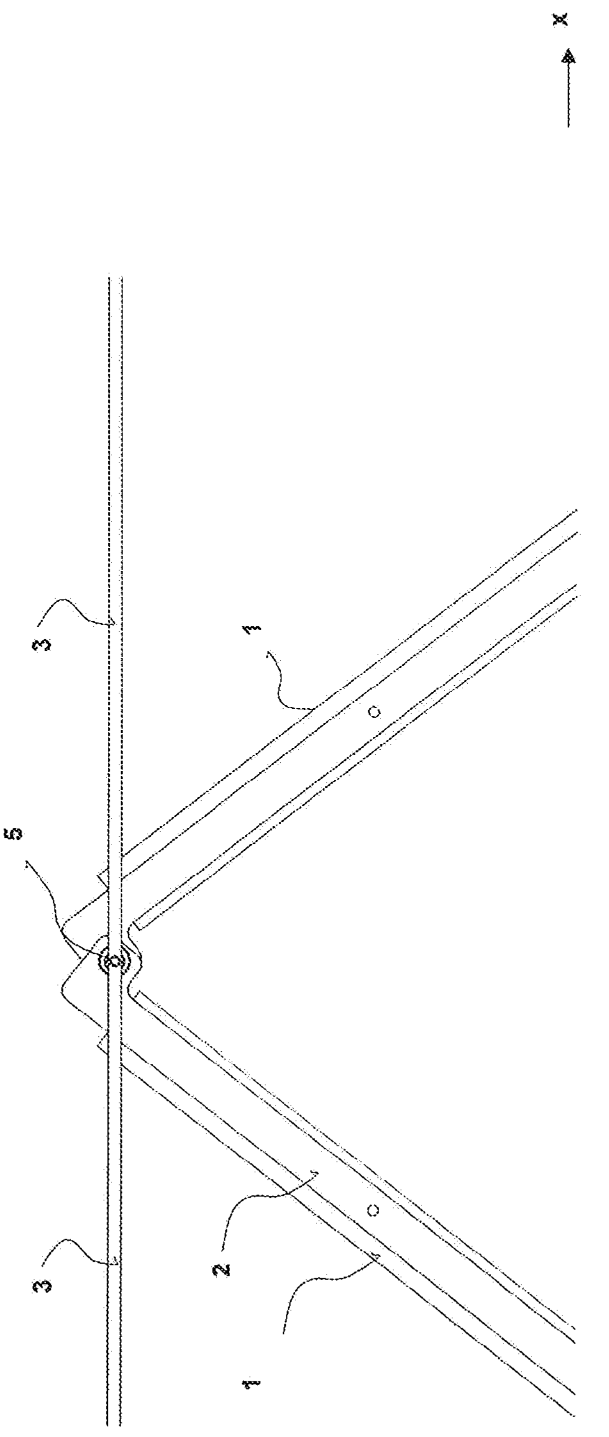

FIG. 6 shows a detail of the system, where the frames (2) of the solar panels (1) on the upper side are (hinged) connected (5) and horizontally connected with the upper side tension-compression element (3).

Figure 7:
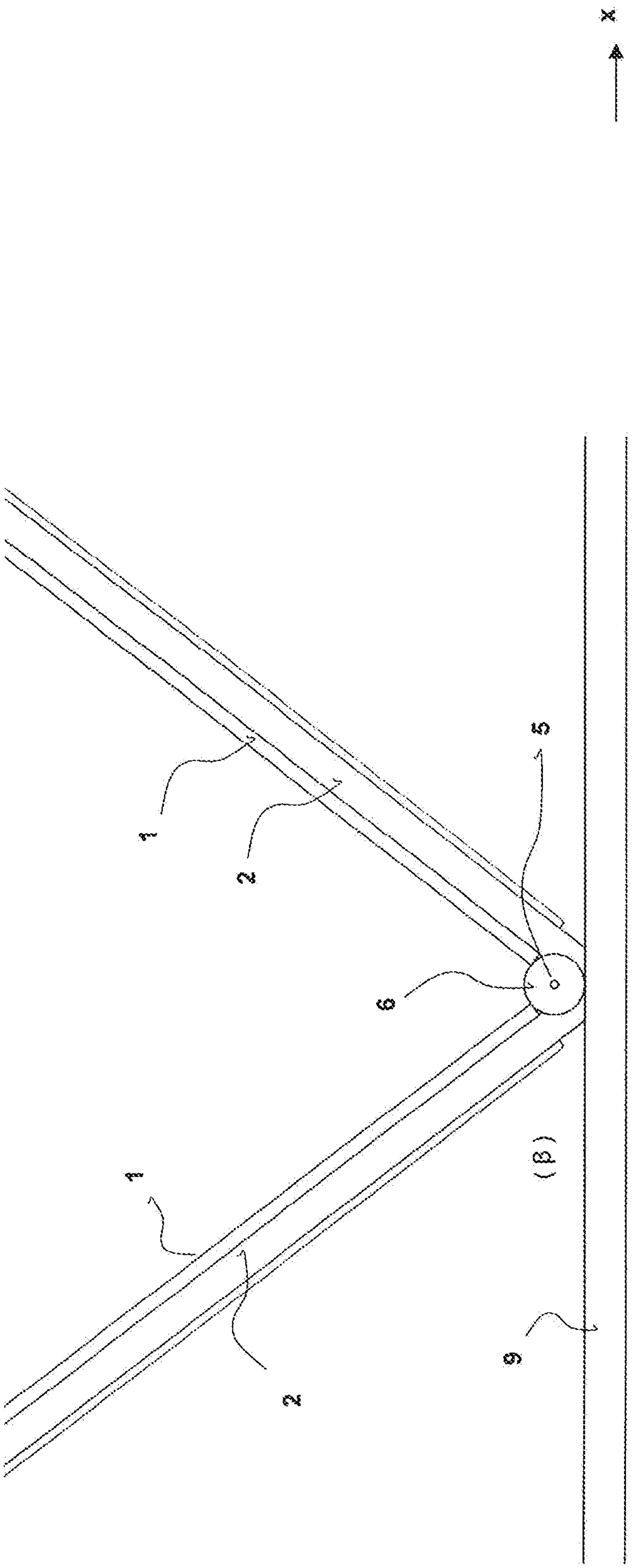

FIG. 7 shows a detail of the lower side with hinge point (5) of frame (2) and solar panel (1) equipped with a wheel (9) which rides along the lower beam or rail (6) or directly on to the foundation. During unfolding the angle beta will reduce with the horizontal (the roof surface).

Figure 8:
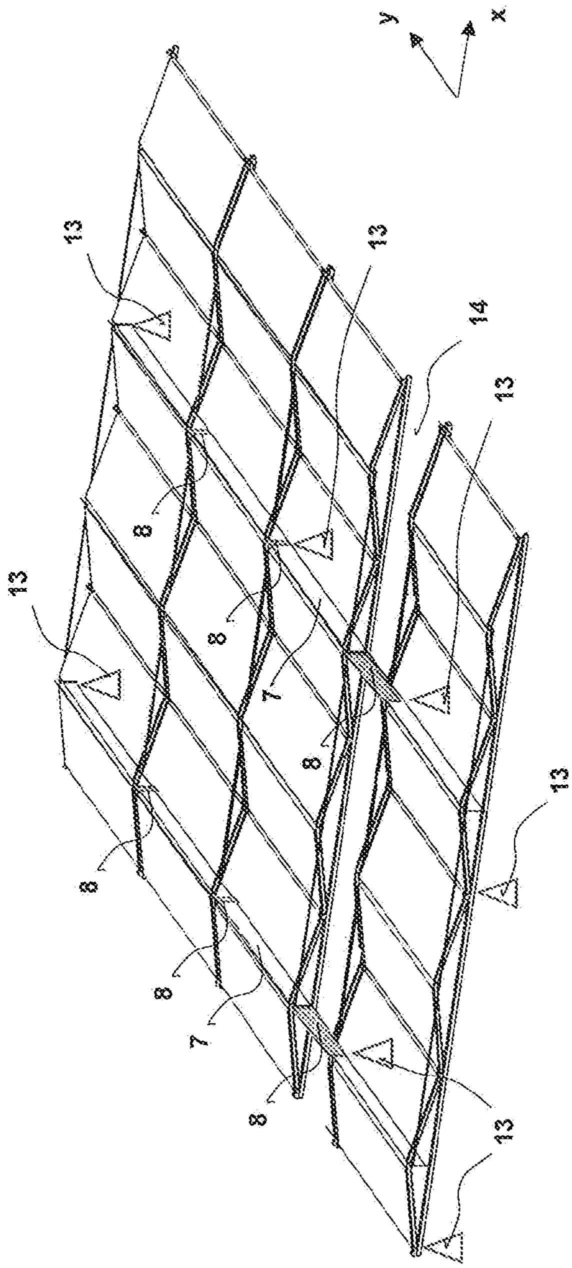

FIG. 8 shows a completely connected system in both directions (x, y). By connecting the transverse partitions (7) with connecting elements (8) the system is also connected "stiff" to the adjacent PV system. The final shape of the connecting element (8) depends on the distance between the 2 adjacent PV systems and is larger if space is required between the connected PV panels (14), for example to create a walk path. The Fig. shows that due to the structurally supporting character of the invention, a PV system can also be installed on a foundation with merely a limited amount of irregularly distributed load bearing points (13) (as is the case with a "weak" roof).

Figure 9:
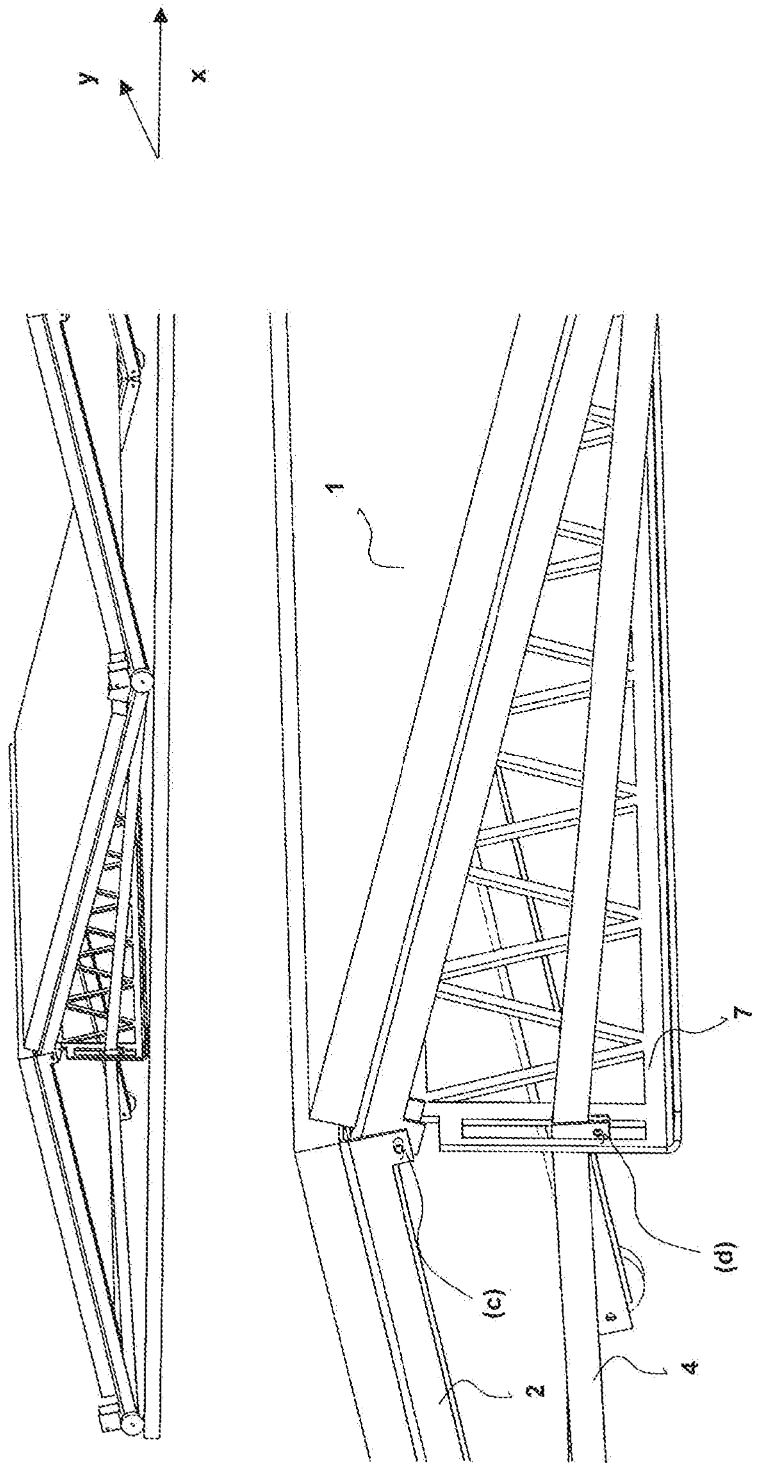

FIG. 9 shows a spatial view underneath the structure to clearly show the various functions of the transverse partition (7). The transverse partition is necessary to create a stiff connection perpendicular to the unfolding direction (y), but also supports and guides the lower tensions compression element (4) if this is hinged at the center (point d).

The transverse partition in this configuration can serve as a shortener of the buckling length as well as an element to click and lock the unfolded system. If 2 adjacent PV systems are connected stiff together, the connecting element (8) can be connected to points c and d.

It is to be noticed that the invention is not limited to the embodiments discussed above. It is also possible to use flexible strips instead of using hinges between the panels or frameworks. It can also be possible to establish click connection in the hinges, when the panels or frameworks reach their final mutual angle.

Such and other variants will be clear to the skilled person and are to be considered inside the framework of the invention as stated in the following conclusions.

LIST WITH REFERENCE NUMBERS

1. PV- or solar panels:
2. side edges of the solar panel:
3. tension or compression element topside:
4. tension or compression element bottom side:
5. hinge point:
6. wheel
7. transverse partition
8. Connecting element
9. Rail:
10. Support point
11. Fixation point:
12. Foundation or roof
13. Load-bearing point in the support structure
14. 14. Gap

LIST OF USED SYMBOLS x longitudinal direction of PV-system
y transversal direction perpendicular to PV-system
a Angle solar panel-foundation/roof Angle solar panel-foundation/roof
h Height of the truss structure
a displacement of mechanism in horizontal direction
b displacement of mechanism in vertical direction
c hinge point
d hinge point
I, II, III, IV numbering of some solar panels in the system L distance of the unfolded system
L1 PV-panel length
B1 PV-panel width
L2 PV-panel length
B2 PV-panel width

The invention claimed is:

1. A PV system, suitable to be installed on a foundation having load carrying points for carrying the PV system, comprising:

several panels with solar cells, wherein the panels become structurally load bearing components of the system, wherein the panels extend in a horizontal arrangement and include an upper side and an underside, wherein the panels are connected using upper side tension or compression elements running substantially parallel to and spanning a longitudinal length of the upper side of the panels connecting the panels to one another and at least one underside tension or compression element spanning the underside of the panels, in such a way that in an unfolded horizontally extending configuration, a spatial truss with a self-supporting span in the longitudinal direction (x) structure is created, wherein the panels extend between and are supported by at least two of the load carrying points of the foundation, wherein the upper side tension or compression elements are provided on a first side edge and a second side edge which create a connection between the first side edges of the several panels and a connection between the second side edges of the several panels, wherein the panels are mutually connected at hinge points defined by the panels, and wherein the upper side tension or compression elements are secured to the hinge points of the panels.

2. The PV system according to claim 1, wherein the panels are mutually connected.

3. The PV system according to claim 2, wherein the first side edge and the second side edge of the panels are oppositely disposed, and wherein the system comprises at least two end panels having a first side edge and a second side edge and, wherein the first side edge of the panels is connected to the first side edge of the end panels and the second side edge of the panels is connected to the second side edge of the end panels.

4. The PV system according to claim 1, wherein in the unfolded configuration the panels form an angle mutually with adjacent solar panels.

5. The PV system according to claim 1, wherein the first side edge or the second side edge is provided with gliders, rollers or wheels.

6. The PV system according to claim 5, wherein the system is provided with extending rails or guides, wherein, upon which or over which the sliders, wheels or rollers move.

7. The PV system according to claim 1, wherein the panels can also contain wind shields or cover plates.

8. The PV system according to claim 1, wherein the system comprises a folded and the unfolded configuration.

* * * * *